(12) United States Patent
Denton

(10) Patent No.: US 7,954,158 B2
(45) Date of Patent: May 31, 2011

(54) CHARACTERIZING COMPUTER ATTACKERS

(75) Inventor: Guy S. Denton, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 11/612,570

(22) Filed: Dec. 19, 2006

(65) Prior Publication Data
US 2008/0148404 A1  Jun. 19, 2008

(51) Int. Cl.
*H04L 29/00* (2006.01)

(52) U.S. Cl. ................. 726/23; 726/24; 726/25

(58) Field of Classification Search ...... 726/23
See application file for complete search history.

(56) References Cited

U.S. PATENT DOCUMENTS

| 5,359,659 | A | * | 10/1994 | Rosenthal | 726/24 |
|---|---|---|---|---|---|
| 6,088,804 | A | | 7/2000 | Hill et al. | |
| 6,487,666 | B1 | * | 11/2002 | Shanklin et al. | 726/23 |
| 7,398,553 | B1 | * | 7/2008 | Li | 726/22 |
| 7,418,732 | B2 | * | 8/2008 | Campbell et al. | 726/23 |
| 2001/0052014 | A1 | | 12/2001 | Sheymov et al. | |
| 2002/0143963 | A1 | | 10/2002 | Converse et al. | |
| 2002/0188864 | A1 | | 12/2002 | Jackson | |
| 2004/0003286 | A1 | | 1/2004 | Kaler et al. | |
| 2005/0177868 | A1 | * | 8/2005 | Kwan | 726/11 |
| 2006/0161984 | A1 | * | 7/2006 | Phillips et al. | 726/24 |

FOREIGN PATENT DOCUMENTS

KR  2001105490 A  5/2000

OTHER PUBLICATIONS

Edmark and Converse, "Web Server Intrusion Detection Method and Apparatus", Mar. 13, 2001.

* cited by examiner

*Primary Examiner* — Nasser Moazzami
*Assistant Examiner* — Ghazal Shehni
(74) *Attorney, Agent, or Firm* — Patrick J. Daugherty; Driggs, Hogg, Daugherty & Del Zoppo Co., LPA

(57) ABSTRACT

The present invention provides a system, method, and program product for characterizing computer attackers by obtaining attack pattern information about computer attacks performed over time and generating an attacker signature for each attacker based on the attack pattern information.

15 Claims, 2 Drawing Sheets

CHARACTERIZING COMPUTER ATTACKERS

FIELD OF THE INVENTION

The present invention generally relates to computing systems and, more particularly, to a method, system, and program product for characterizing computing system attackers.

BACKGROUND OF THE INVENTION

Computing systems have revolutionized the manner in which individuals, businesses, etc. perform daily activities. When connected to a network, they provide a powerful communications tool. Unfortunately, a network connection renders the computing system susceptible to unauthorized access and/or eavesdropping by malicious attackers and crackers, even with precautions such as firewalls, passwords and the like.

As a result, security defense systems have been developed for computing systems to provide secure environments for authorized users. A typical security defense mechanism reactively defends against unauthorized access. Such measures generally are based on machine driven logic such as an attacker's IP address.

Unfortunately, computing systems do not attack other computing systems. Rather, attackers use computing systems to attack other computing systems, and attackers can change their attack points (e.g., the source computing system, the IP address, etc.). Consequently, attackers commonly are able to hide from such defense systems by changing the attack point.

SUMMARY OF THE INVENTION

In general, the present invention provides a method, system, and program product for characterizing attackers. Specifically, the present invention provides a technique in which attacker usage patterns are used to generate a collection of electronic signatures or fingerprints for attackers. From the signature(s), a next attack of an attacker can be predicted based on recognized usage and averted.

In one aspect, a system includes a first component that obtains attack pattern information about one or more computer attacks over time. A second component generates an attacker signature for an attacker based on the attack pattern information. A third component identifies a subsequent attack from the attacker by the signature of the attacker.

In another aspect, a method for averting computer attacks includes identifying an attacker from an attack by the attacker based on attack pattern information and determining and averting a next attack by the attacker based on corresponding attack pattern information.

In another aspect, a method includes producing computer executable program code, storing the code on a computer readable medium, and providing the program code to be deployed and executed on a computer system. The program code including instructions which, when executed on the computer system, causes the computer system to obtain attack patterns about a plurality of different attacks, generate an electronic signature for a corresponding attacker based on the attack patterns, and predict a next attack by the attacker based on the electronic signature.

In another aspect, a method for deploying an application for assigning a digital signature to a computer attacker includes providing a computer infrastructure being operable to generate an electronic fingerprint for an attacker based on the attack pattern of the attacker as derived from one or more attacks by the attacker and predict a next attack by the attacker based on the electronic fingerprint.

BRIEF DESCRIPTION OF THE DRAWINGS

These and other features of this invention will be more readily understood from the following detailed description of the various aspects of the invention taken in conjunction with the accompanying drawings in which.

Figure 1:
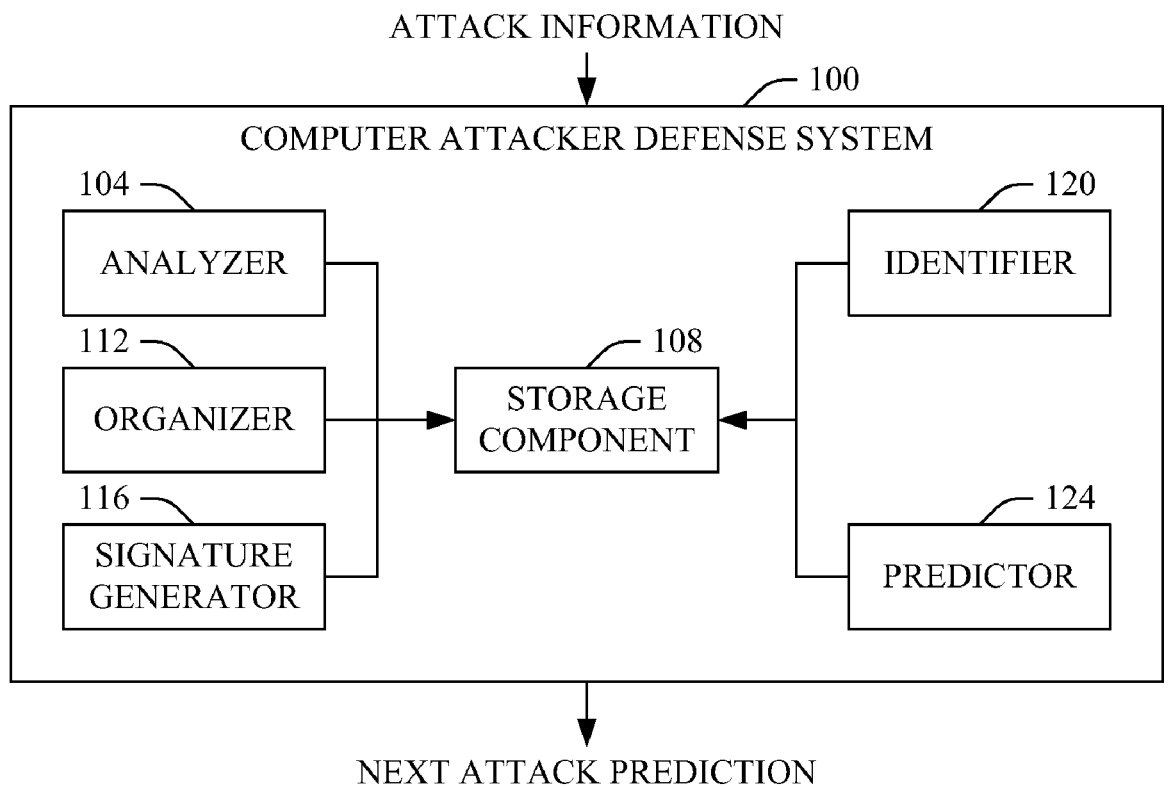
FIG. 1 illustrates an exemplary computer security defense system.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections I. General Description II. Computerized Implementation I. General Description Conventional security defense systems typically are based on attack points such as IP addresses. However, an attacker can change the attack point. What typically does not change is an attacker's usage pattern, or how they attack, since the usage pattern generally is based on the attacker's skill set. The present invention provides a technique in which attacker usage patterns are used to develop an electronic signature or fingerprint for an attacker. From the signature, an attack can be associated with an attacker, and a future attack by that attacker can be predicted based on recognized usage and averted.

FIG. 1 illustrates an exemplary computer attacker security defense system 100 for generating attacker signatures and using such signatures to avert future attacks. The system 100 can be used to defend against attacks on computing systems such as computers, servers, data repositories, and the like by viruses, agents, malicious code, people using other computers, etc. Such attacks may include unauthorized use of the attacked computer's processing and communication capabilities, unauthorized access to files stored therein, corruption of such files, etc.

The attacker defense system 100 includes an analyzer 104 that analyzes computer attacks and/or related information to obtain information about attacks. In one instance, the attack analyzer 104 determines the type of an attack, the source of an attack (e.g., its IP address, the country of origin, etc.), the target of the attack target, the timing of the attack, as well as other attack information. This information is stored in a storage component 108. It is to be appreciated that attack itself can be discovered through any known approach.

An organizer 112 organizes the stored attack information. In one instance, this includes grouping the attack information, for example, based on attack location. This also includes updating the groupings as further attack information is acquired. The groupings of attack information provide information about each attacker.

A signature generator 116 generates a collection of electronic signatures or fingerprint for each attacker from attack patterns derived from the stored attack information. The collection includes signatures that are generated for different moments in time. For example, after each attack or after some other triggering criteria is met, another set of signatures are generated to reflect the updated attack information. By relating attack signatures based on attack patterns to attackers, an attacker can be identified regardless of the attack point.

An attack identifier 120 identifies attackers based on the attack signatures. When information about an attack is received, the attack identifier 120 checks the attack signatures in the storage component 108 to determine whether the attacker can be identified based on the stored attack pattern information. If a match is found, the attacker is identified by the signature. In some instances, the signature(s) identifies several possible attackers.

A predictor 124 predicts future attacks by an identified attacker(s) based on the attacker signatures. If an attacker(s) is identified from an attack signature, the corresponding attack signature is used to obtain the attack pattern of the attacker(s). The attack pattern is used to predict the next attack. For example, if the attack pattern shows that the attacker(s) typically follows the current type attack with another particular type of attack, then the predictor 124 predicts that the particular type of attack is the next attack from this attacker(s). The prediction also includes information such as the timing of the next attack. From this information, measures can be taken to avert the predicted attack.

Figure 2:
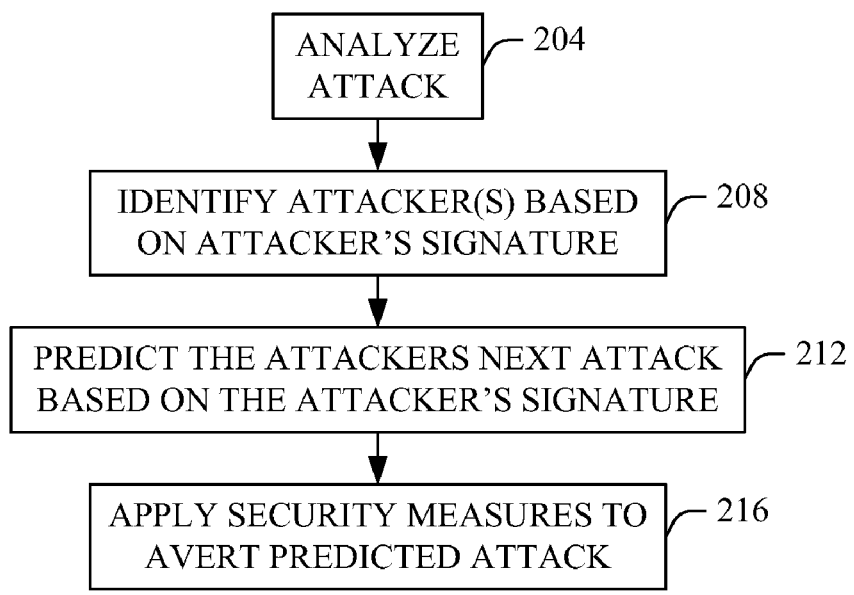
FIG. 2 illustrates an exemplary method for averting security attacks based on attacker attack patterns.

FIG. 2 illustrates an exemplary method for using an attack signature(s) to identify an attacker(s) and averting a future attack by the identified attacker(s) based on the attack pattern described by one or more corresponding attacker signatures.

At reference numeral 204, the analyzer 104 analyzes an attack on the computing systems that the attack defense system 100 is monitoring. From the analysis, the analyzer 104 obtains various attack related information such as an attack type, a source of the attack, related timing information, etc.

At 208, the attack identifier 120 uses this information to identify the attacker(s) by attack pattern through the collections of electronic attacker signatures. Generation of the electronic attacker signatures is described in greater detail below in connection with FIG. 3. In general, since more than one attacker can be associated with an attack signature, the identifier 120 may identify more than one attacker as being potentially responsible for the analyzed attack.

At 212, the predictor 124 predicts the next attack based on the signature. As noted above, the signature is indicative of the attack pattern. Therefore, the historical attack information can be used to determine an attacker's next likely attack. For example, if the attack pattern shows a particular sequence of attacks, then the predictor 124 predicts that next attack by the attacker(s) based on the current attack.

At 216, security measures such as, but not limited, to closing communication ports can be applied to avert the predicted next attack. In instances in which the signature identifies multiple attackers, the measures may include a plurality of different defense measures.

Figure 3:
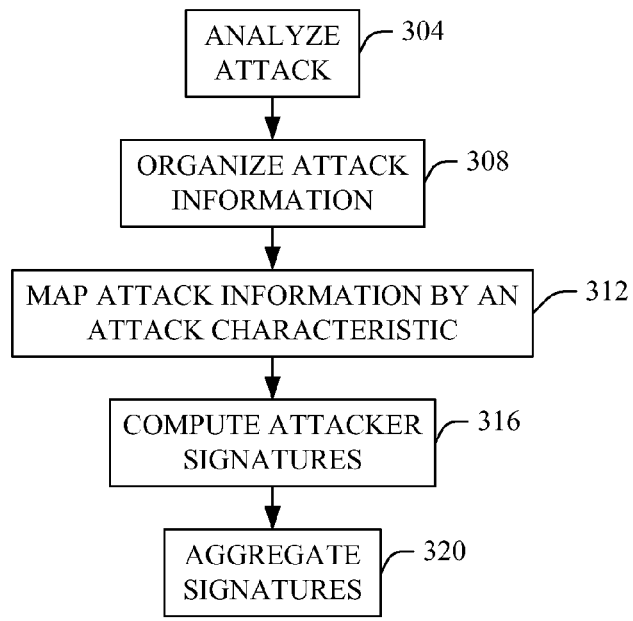
FIG. 3 illustrates an exemplary method for generating computer attacker signatures.

FIG. 3 illustrates an exemplary method for generating attacker signatures that are used to identify attackers and/or predict an identified attacker's next attack. At 304, the analyzer 104 analyzes an attack on the computing system monitored by the computer attacker security defense system 100 to obtain attack and/or attacker information. At 308, the organizer 112 groups or otherwise organizes this information within the storage component 108. At 312, the signature component 116 generates an initial attack mapping based on the attack information. For example, the mapping may be based on attack type and location of attack.

At 316, the signature component 116 computes a set of first signatures for one or more attackers based on the stored information. The above steps are repeated, for example, after each attack, and a plurality of subsequent sets of signatures are generated. At 320, the signatures for each attacker are aggregated such that each attacker is associated with a collection of signatures. The collection of signatures is used by the system 100 to identify, predict, and avert future attacks as described above in connection with FIG. 2. The collection of signatures can also be shared with other computer attacker security defense systems, and such systems can share their signatures with the system 100.

The above method is now described in relation to a particular non-limiting example. For explanatory purposes and sake of brevity, assume that several different attacks from various sources have occurred over time and these attacks are now being analyzed. However, it is to be appreciated that each attack may be analyzed as described herein after it occurs or is discovered.

For this example, assume that the analyzer 104 has obtained attack information such as attack types A, B, C, D, and E, respective attack timing information $T_A$, $T_B$, $T_C$, $T_D$ and $T_E$, and attack locations W, X, Y, and Z. The timing information includes data such as a relative time of the attack and/or the time interval between attacks. This provides information such as when the attacker attacks and the frequency at which the attacker attacks. The location may indicate information such as a country of origin, identification, an IP address, etc. It is to be understood that the nomenclature used to identify this information is arbitrary and does not confer any ordering, priority, significance, uniqueness, etc.

As noted above, the organizer 112 delineates this information. For example, in one instance the organizer 112 groups the attack types A, B, C, D, and E (and corresponding timing information $T_A$, $T_B$, $T_C$, $T_D$ and $T_E$) based on the locations W, X, Y, and Z. However, it is to be understood that other groupings are also contemplated herein. For example, the groupings could have been by timing information, attack type, or other attack related information. For this example, assume the following location based groupings:

W: Attack types A, B, C, and E;
X: Attack types A, B, C, and E;
Y: Attack types A, B, and D; and
Z: Attack types B, C, D, and A.

From these groupings, it can be seen that an attack type can originate from more than one source (e.g., attack types A, B, C, D, and E). In addition, the same set of attack types (e.g., A, B, C, and E) may occur in connection with different sources (e.g., W and X). Furthermore, the order of the attack may vary from source to source (e.g., attack type A is the first attack type for source W and the fourth attack type from source z).

The signature component 116 generates preliminary signatures from the groupings as a function of location. For instance, in this example, the signature component 116 generates preliminary signatures W(A), W(B), W(C), and W(E) for location W, preliminary signatures X(A), X(B), X(C), and X(E) for location X, preliminary signatures Y(A), Y(B), and Y(D) for location Y, and preliminary signatures Z(B), Z(C), Z(D), and Z(A) for location Z. The preliminary signatures are stored in a signature matrix or table within the storage component 108. An example of such a matrix follows:

|   | A | B | C | D | E |
|---|---|---|---|---|---|
| W | 1 | 1 | 1 | 0 | 1 |
| X | 1 | 1 | 1 | 0 | 1 |
| Y | 1 | 1 | 0 | 1 | 0 |
| Z | 1 | 1 | 1 | 1 | 0. |

From this matrix and the attack timing information, the signature component 1116 computes a signature for each row from the data in the row and the corresponding attack timing information. Each of these signatures is associated with a different attacker. For the attackers and attacks types in the illustrated example, an exemplary first set of signatures is as follows:

Attacker 1: $F1(1)=AT_{A1} BT_{B1} CT_{C1} 0 ET_{E1}$;
Attacker 2: $F2(1)=AT_{A2} BT_{B2} CT_{C2} 0 LT_{E2}$;
Attacker 3: $F3(1)=AT_{A3} BT_{B3} 0 DT_{D3} 0$; and
Attacker 4: $F4(1)=AT_{A4} BT_{B4} CT_{C4} DT_{D4} 0$.

In this example, $AT_{A1}$ refers to a type A attack and corresponding timing information T for attacker 1, $BT_{B1}$ refers to a type B attack and corresponding timing information T for attacker 1, . . . . It is noted that the above entries do not confer an order in which the different attack types were deployed.

In one instance, the above attack signature renders a numeric signature for each attacker. In another instance, the above renders an alpha-numeric signature for each attacker. In either instance, the signature may be a single value or a string of values.

A subsequent set of signatures is generated after another attack or set of attacks. As described above, for this new attack(s), the signature component 1116 generates a preliminary signature. For example, assume the new attack is a type F attack from the location W. From this attack, the signature component 1116 generates preliminary signature W(F) for attack type F for location W. The signature component 116 updates the signature matrix with this preliminary signature as follows:

|   | A | B | C | D | E | F |
|---|---|---|---|---|---|---|
| W | 1 | 1 | 1 | 0 | 1 | 0 |
| X | 1 | 1 | 1 | 0 | 1 | 1 |
| Y | 1 | 1 | 0 | 1 | 0 | 0 |
| Z | 1 | 1 | 1 | 1 | 0 | 0. |

From the updated matrix and the timing information, a second exemplary set of signatures is generated for the attackers as follows:

Attacker 1: $F1(2)=AT_{A1} BT_{B1} CT_{C1} 0 ET_{E1} 0$;
Attacker 2: $F2(2)=AT_{A2} BT_{B2} CT_{C2} 0 ET_{E2} 1$;
Attacker 3: $F3(2)=AT_{A3} BT_{B3} 0 DT_{D3} 0 0$; and
Attacker 4: $F4(2)=AT_{A4} BT_{B4} CT_{C4} DT_{D4} 0 0$.

The signatures from each set of signatures for each attacker are aggregated such that each attacker is associated with a collection or set of signatures. For instance, from above example, Attacker 1 is associated with signatures F1(1) and F1(2), Attacker 2 is associated with signatures F2(1) and F2(2), Attacker 3 is associated with signatures F3(1) and F3(2), and Attacker 4 is associated with signatures F4(1) and F4(2). The aggregation of signatures is updated with each new set of signatures to generate a matrix of signatures for each attacker. With the collection of signatures, the system can identify attackers and predict a next attack as described above in connection with FIG. 2.

II. Computerized Implementation

Figure 4:
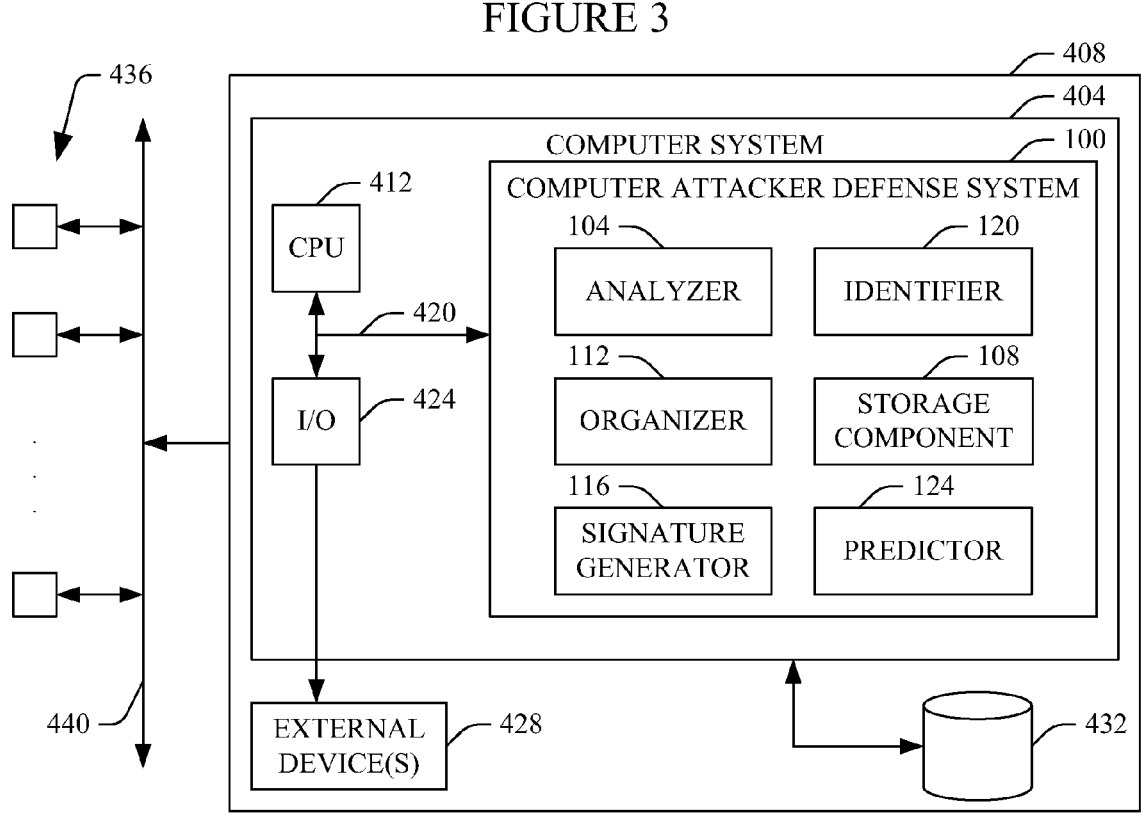
FIG. 4 illustrates an exemplary computerized implementation of the computer security defense system.

Referring now to FIG. 4, an exemplary computerized implementation includes a computer system 404 deployed within a computer infrastructure 408 such as that existing with the attack defense system 100 described above. This is intended to demonstrate, among other things, that the present invention could be implemented within a network environment (e.g., the Internet, a wide area network (WAN), a local area network (LAN), a virtual private network (VPN), etc.), or on a stand-alone computer system.

In the case of the former, communication throughout the network can occur via any combination of various types of communication links. For example, the communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, computer infrastructure 408 is intended to demonstrate that some or all of the components of implementation 100 could be deployed, managed, serviced, etc. by a service provider who offers to implement, deploy, and/or perform the functions of the present invention for others.

As shown, the computer system 404 includes a processing unit 412, a memory 416, a bus 420, and input/output (I/O) interfaces 424. Further, the computer system 404 is shown in communication with external I/O devices/resources 428 and storage system 432. In general, the processing unit 412 executes computer program code, such as the code to implement the computer attacker defense system 100, which is stored in memory 416 and/or storage system 432. It is to be appreciated that two or more, including all, of these components may be implemented as a single component.

While executing computer program code, the processing unit 412 can read and/or write data to/from the memory 416, the storage system 432, and/or the I/O interfaces 424. The bus 420 provides a communication link between each of the components in computer system 404. The external devices 428 can comprise any devices (e.g., keyboard, pointing device, display, etc.) that enable a user to interact with computer system 404 and/or any devices (e.g., network card, modem, etc.) that enable computer system 404 to communicate with one or more other computing devices.

The computer infrastructure 408 is only illustrative of various types of computer infrastructures for implementing the invention. For example, in one embodiment, computer infrastructure 408 comprises two or more computing devices (e.g., a server cluster) that communicate over a network to perform the various process steps of the invention. Moreover, computer system 404 is only representative of various possible computer systems that can include numerous combinations of hardware.

To this extent, in other embodiments, computer system 404 can comprise any specific purpose-computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 412 may comprise a single processing unit, or be distributed across one or more processing units in one or more locations, e.g., on a client and server. Similarly, the memory 416 and/or the storage system 432 can comprise any combination of various types of data storage and/or transmission media that reside at one or more physical locations.

Further, I/O interfaces 424 can comprise any system for exchanging information with one or more of the external device 428. Still further, it is understood that one or more additional components (e.g., system software, math co-processing unit, etc.) not shown in FIG. 4 can be included in computer system 404. However, if computer system 404 comprises a handheld device or the like, it is understood that one or more of the external devices 428 (e.g., a display) and/or the storage system 432 could be contained within computer system 404, not externally as shown.

The storage system 432 can be any type of system (e.g., a database) capable of providing storage for information under the present invention. To this extent, the storage system 432 could include one or more storage devices, such as a magnetic disk drive or an optical disk drive. In another embodiment, the storage system 432 includes data distributed across, for example, a local area network (LAN), wide area network (WAN) or a storage area network (SAN) (not shown). In addition, although not shown, additional components, such as cache memory, communication systems, system software, etc., may be incorporated into computer system 404.

Shown in the memory 416 of computer system 404 is the computer attacker defense system 100, which includes the analyzer 104, the storage component 108, the organizer 112, the signature generator 116, the identifier 120, and the predictor 124. In another implementation, two or more of these components, including all of the components, can be a single component. These components perform the functions discussed above.

Specifically, the analyzer 104, the storage component 108, the organizer 112 and the signature generator 116 will work in cooperation to generate a collection of attacker signatures based on attacker attack patterns for each attacker. These components will also work together to periodically update the collections of attacker signatures. Using this information, the analyzer 104, the storage component 108, the identifier 120, and the predictor 124 work in cooperation to identify an attack by its attacker, and the attack identity and attack pattern is used to prevent a next predicted attack by the attacker derived from the attacker's signature. In the illustrated embodiment, attackers and victims of attack use the computing systems 436, which communicate over a common path 440 that is monitored by computer system 404 through the infrastructure 408.

While shown and described herein as a method and a system, it is understood that the invention further provides various alternative embodiments. For example, in one embodiment, the invention provides a computer-readable/useable medium that includes computer program code to enable a computer infrastructure to identify and stop attackers. To this extent, the computer-readable/useable medium includes program code that implements each of the various process steps of the invention.

It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 416 (FIG. 4) and/or the storage system 432 (FIG. 4) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider could offer to manage the computer attacker defense system 100. In this case, the service provider can create, maintain, support, etc., a computer infrastructure, such as the computer infrastructure 408 (FIG. 4) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing the computer attacker defense system 100. In this case, a computer infrastructure, such as computer infrastructure 408 (FIG. 4), can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as computer system 404 (FIG. 4), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

Still yet, any of the components of the present invention could be deployed, managed, serviced, etc. by a service provider who offers to characterize computer attackers and/or predict an attacker's next attack based on such characterization.

I claim:

1. A method for generating attacker signatures, the method comprising:

grouping a plurality of computer system attacks into a plurality of preliminary signatures as a function of a first data of type data, timing information data and origin location data of each of the attacks, each of the preliminary signatures associated with a different value of the first data;

storing the preliminary signatures into a signature matrix in a computer hardware storage device by:

creating rows for the preliminary signatures, one row for each different preliminary signature;

creating columns, one for each different value of a second data of the type data, the timing information data and the origin location data of the each attack, the second data different from the first data; and populating each column and row intersection as a function of matching respective attack data to intersecting row first data and column second data;

generating an attacker signature for each row of the matrix as a function of the matrix data in each row and a third data of the type data, the timing information data and the origin location data of the attacks, the third data different from the first data and the second data; and associating each of the attacker signatures with a different attacker;

obtaining a type data, a timing information data and an origin location data from an attack on the computer system subsequent to the plurality of attacks, wherein a one of the subsequent attack type data, timing information data and origin location data is a new kind relative to a respective one of the plurality of attacks type data, timing information data and origin location data;

revising the preliminary signatures into subsequent preliminary signatures as a function of the new kind of subsequent attack data;

revising the signature matrix in the computer hardware storage device by creating another row or column for the new kind of subsequent attack data;

populating the revised matrix at each column and row intersection as a function of matching the respective attack data to intersecting row first data and column second data;

generating subsequent attacker signatures for each row of the revised matrix as a function of the matrix data in each row and the corresponding third data; and associating each of the subsequent attacker signatures with the respective attacker signatures and the different attackers.

2. The method of claim 1, wherein the associating the each of the subsequent attacker signatures with the respective attacker signatures and the different attackers comprises aggregating the signatures from each set of signatures for each attacker.

3. The method of claim 2, wherein the aggregating comprises generating a matrix of signatures for each attacker.

4. The method of claim 1, further comprising:
obtaining a type data, a timing information data and an origin location data from another attack on the computer system subsequent to the plurality of attacks;
identifying an attacker by comparison to the attacker signatures; and
predicting a next attack indicated by an attack pattern of at least one attacker signature associated with the identified attacker.

5. The method of claim 1, wherein the timing information data comprises a time of attack or a time interval between attacks.

6. The method of claim 1 wherein the location data comprises a country of origin, an identification or an internet protocol address.

7. A computer system for generating attacker signatures, the computer system comprising:
a processing unit, computer readable memory and a computer readable storage system;
first program instructions to group a plurality of computer system attacks into a plurality of preliminary signatures as a function of a first data of type data, timing information data and origin location data of each attack, each of the preliminary signatures associated with a different value of the first data;

second program instructions to store the preliminary signatures into a signature matrix into the computer readable storage system by creating rows for the preliminary signatures, one row for each different preliminary signature; creating columns, one for each different value of a second data of the type data, the timing information data and the origin location data of the each attack, the second data different from the first data; and populating each column and row intersection as a function of matching respective attack data to intersecting row first data and column second data;

third program instructions to generate an attacker signature for each row of the matrix as a function of the matrix data in each row and a third data of the type data, the timing information data and the origin location data of the attacks, the third data different from the first data and the second data, and associate each of the attacker signatures with a different attacker; and fourth program instructions stored on the computer readable storage system for execution by the processing unit via the computer readable memory to:

obtain a type data, a timing information data and an origin location data from a computer system attack subsequent to the plurality of attacks, wherein a one of the subsequent attack type data, timing information data and origin location data is a new kind relative to a respective one of the plurality of attacks type data, timing information data and origin location data;

revise the preliminary signatures into subsequent preliminary signatures as a function of the new kind of subsequent attack data;

revise the signature matrix in the computer hardware storage device by creating another row or column for the new kind of subsequent attack data;

populate the revised matrix at each column and row intersection as a function of matching the respective attack data to intersecting row first data and column second data;

generate subsequent attacker signatures for each row of the revised matrix as a function of the matrix data in each row and the corresponding third data; and associate each of the subsequent attacker signatures with the respective attacker signatures and the different attackers; and wherein the first, second, third and fourth program instructions are stored on the computer readable storage system for execution by the processing unit via the computer readable memory.

8. The system of claim 7, wherein the fourth program instructions are further to associate the each of the subsequent attacker signatures with the respective attacker signatures and the different attackers by aggregating the signatures from each set of signatures for each attacker into a matrix of signatures for each attacker.

9. The system of claim 7, further comprising:
fifth program instructions stored on the computer readable storage system for execution by the processing unit via the computer readable memory to:
obtain a type data, a timing information data and an origin location data from another attack on the computer system subsequent to the plurality of attacks;
identify an attacker by comparison to the attacker signatures; and predict a next attack indicated by an attack pattern of at least one attacker signature associated with the identified attacker.

10. A computer program product for generating attacker signatures, the computer program product comprising:
   a computer readable storage medium;
   first program instructions to group a plurality of attacks on a computer system into a plurality of preliminary signatures as a function of a first data of type data, timing information data and origin location data of each attack, each of the preliminary signatures associated with a different value of the first data;
   second program instructions to store the preliminary signatures into a signature matrix into the computer readable storage system by creating rows for the preliminary signatures, one row for each different preliminary signature; creating columns, one for each different value of a second data of the type data, the timing information data and the origin location data of the each attack, the second data different from the first data; and populating each column and row intersection as a function of matching respective attack data to intersecting row first data and column second data;
   third program instructions to generate an attacker signature for each row of the matrix as a function of the matrix data in each row and a third data of the type data, the timing information data and the origin location data of the attacks, the third data different from the first data and the second data, and associate each of the attacker signatures with a different attacker; and
   fourth program instructions stored on the computer readable storage medium to:
   obtain a type data, a timing information data and an origin location data from an attack on the computer system subsequent to the plurality of attacks, wherein a one of the subsequent attack type data, timing information data and origin location data is a new kind relative to a respective one of the plurality of attacks type data, timing information data and origin location data;
   revise the preliminary signatures into subsequent preliminary signatures as a function of the new kind of subsequent attack data;
   revise the signature matrix in the computer hardware storage device by creating another row or column for the new kind of subsequent attack data;
   populate the revised matrix at each column and row intersection as a function of matching the respective attack data to intersecting row first data and column second data;
   generate subsequent attacker signatures for each row of the revised matrix as a function of the matrix data in each row and the corresponding third data; and
   associate each of the subsequent attacker signatures with the respective attacker signatures and the different attackers; and
   wherein the first, second, third and fourth program instructions are stored on the computer readable storage medium.

11. The computer program product of claim 10, wherein the fourth program instructions are further to associate the each of the subsequent attacker signatures with the respective attacker signatures and the different attackers by aggregating the signatures from each set of signatures for each attacker into a matrix of signatures for each attacker.

12. The computer program product of claim 10, further comprising:
   fifth program instructions stored on the computer readable storage medium to:
   obtain a type data, a timing information data and an origin location data from another attack on the computer system subsequent to the plurality of attacks;
   identify an attacker by comparison to the attacker signatures; and
   predict a next attack indicated by an attack pattern of at least one attacker signature associated with the identified attacker.

13. A method for generating attacker signatures, the method comprising: providing a computer infrastructure that: groups a plurality of computer system attacks into a plurality of preliminary signatures as a function of a first data of type data, timing information data and origin location data of each of the attacks, each of the preliminary signatures associated with a different value of the first data;
   stores the preliminary signatures into a signature matrix in a computer hardware storage device by:
   creating rows for the preliminary signatures, one row for each different preliminary signature;
   creating columns, one for each different value of a second data of the type data, the timing information data and the origin location data of the each attack, the second data different from the first data; and
   populating each column and row intersection as a function of matching respective attack data to intersecting row first data and column second data: generates an attacker signature for each row of the matrix as a function of the matrix data in each row and a third data of the type data, the timing information data and the origin location data of the attacks, the third data different from the first data and the second data;
   associates each of the attacker signatures with a different attacker; obtains a type data, a timing information data and an origin location data from an attack on the computer system subsequent to the plurality of attacks, wherein a one of the subsequent attack type data, timing information data and origin location data is a new kind relative to a respective one of the plurality of attacks type data, timing information data and origin location data;
   revises the preliminary signatures into subsequent preliminary signatures as a function of the new kind of subsequent attack data;
   revises the signature matrix in the computer hardware storage device by creating another row or column for the new kind of subsequent attack data;
   populates the revised matrix at each column and row intersection as a function of matching the respective attack data to intersecting row first data and column second data;
   generates subsequent attacker signatures for each row of the revised matrix as a function of the matrix data in each row and the corresponding third data; and
   associates each of the subsequent attacker signatures with the respective attacker signatures and the different attackers.

14. The method of claim 13, wherein the computer infrastructure further associates the each of the subsequent attacker signatures with the respective attacker signatures and the different attackers by aggregating the signatures from each set of signatures for each attacker into a matrix of signatures for each attacker.

15. The method of claim 13, wherein the computer infrastructure further:

obtains a type data, a timing information data and an origin location data from another attack on the computer system subsequent to the plurality of attacks;

identifies an attacker by comparison to the attacker signatures; and predicts a next attack indicated by an attack pattern of at least one attacker signature associated with the identified attacker.

* * * * *